April 20, 1943. W. H. D. BROUSE 2,317,325
FLUID METER
Filed March 12, 1941 5 Sheets-Sheet 1

Inventor.
William H. D. Brouse.

April 20, 1943.   W. H. D. BROUSE   2,317,325
FLUID METER
Filed March 12, 1941   5 Sheets-Sheet 2

Inventor.
William H. D. Brouse

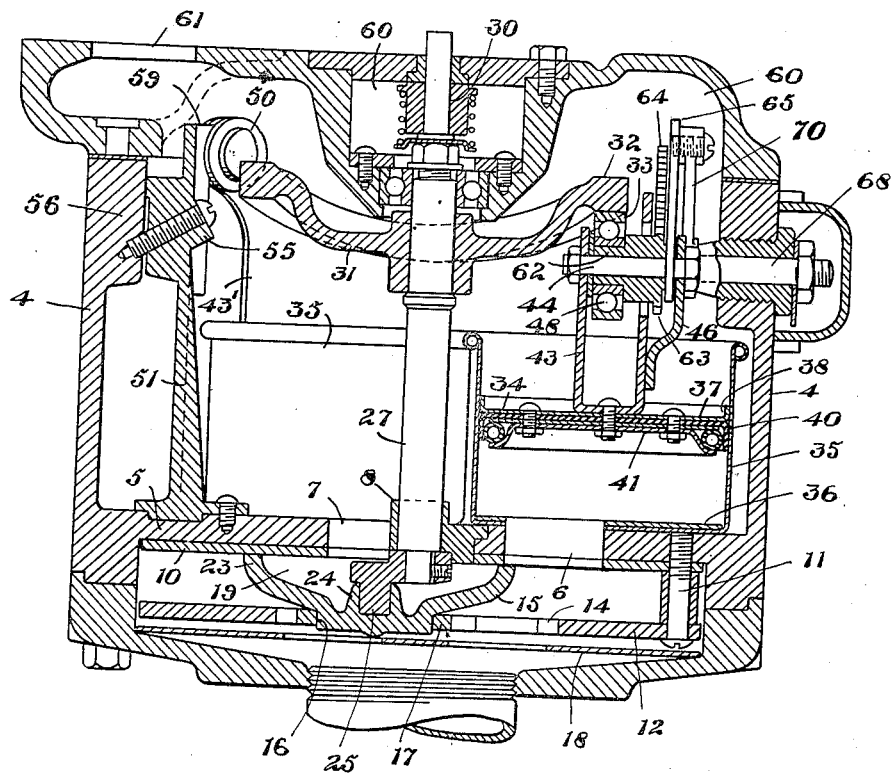
Fig. 2ª

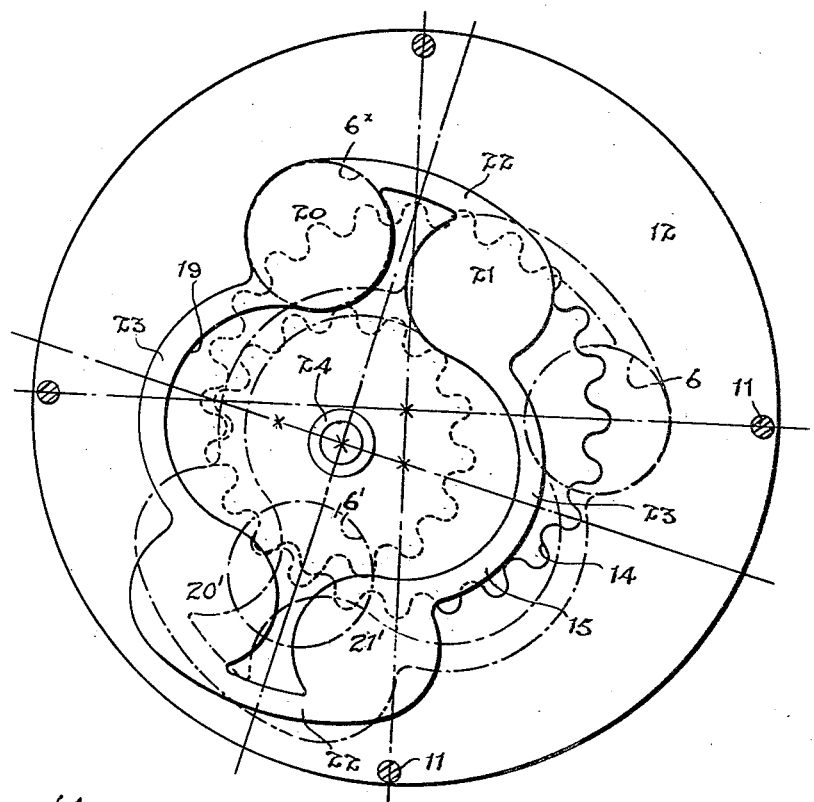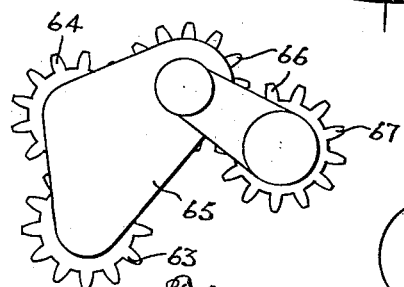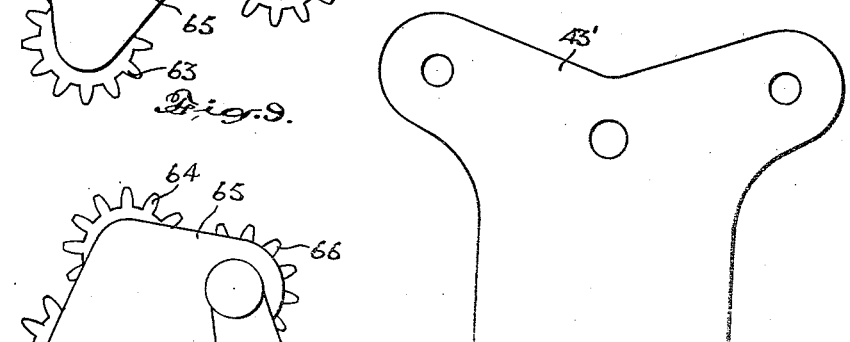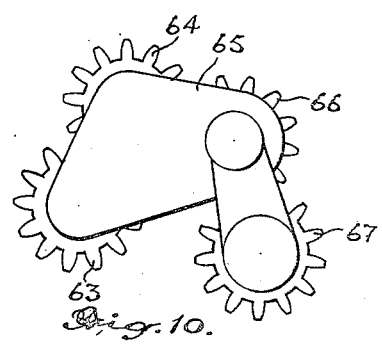

April 20, 1943.  W. H. D. BROUSE  2,317,325
FLUID METER
Filed March 12, 1941   5 Sheets-Sheet 5

Inventor
William H. D. Brouse

Patented Apr. 20, 1943

2,317,325

UNITED STATES PATENT OFFICE 2,317,325

FLUID METER

William H. D. Brouse, Toronto, Ontario, Canada, assignor, by mesne assignments, to John Wood Manufacturing Company, Inc., Philadelphia, Pa.

Application March 12, 1941, Serial No. 382,891

10 Claims. (Cl. 73—244)

This invention relates to the class of fluid meters which are operated by the flow of the fluid being measured in its passage therethrough. Meters of this type are required to function under varying conditions of pressure, rate of flow and viscosity of the liquid to be measured and it is required that measuring accuracy must be maintained under whatever conditions of variable factors encountered.

The principal objects of the present invention are to provide a mechanism which will measure fluids with dependable accuracy and will operate consistently without danger of uncontrolled variation over long periods of use.

A further and important object is to devise a mechanism which will be free from intricate and delicate parts which would be liable to get out of order or be dislodged or disrupted through continued operation and to provide a meter which will not be costly to manufacture.

The principal features of the invention consist in a mechanism wherein a multiplicity of pistons operated consecutively by the flow of fluid through the meter imparts through their longitudinal movement a rotary movement to a crank shaft to rotate a valve in a circular orbit while maintaining a constant contact of geared surfaces to effect the revolution of the valve upon its own axis and through such rotation causing said valve to intermittently close and open ports leading to the measuring cylinders, thereby directing progressive inflow of the fluid to the cylinders to operate the measuring pistons and to direct the outflow of the measured fluid.

In the accompanying drawings

Figure 2a is a section similar to Figure 2 when the valve is positioned midway between the positions shown in Figures 11 and 16 and with the piston in section midway of the inlet stroke.

Figure 4 is a plan section taken on the line 4—4 of Figure 2 with the valve shifted backward from the position shown in Figure 12.

Figure 8 is an elevational detail of one of the piston brackets carrying the cam operating roller.

Figure 9 is an elevational diagrammatic detail of the mechanism for adjusting the stroke of one of the measuring pistons in the position at the bottom of the piston stroke.

Figure 10 is a diagrammatic view similar to Figure 9 at the opposite end of the piston stroke.

Figures 1, 3:
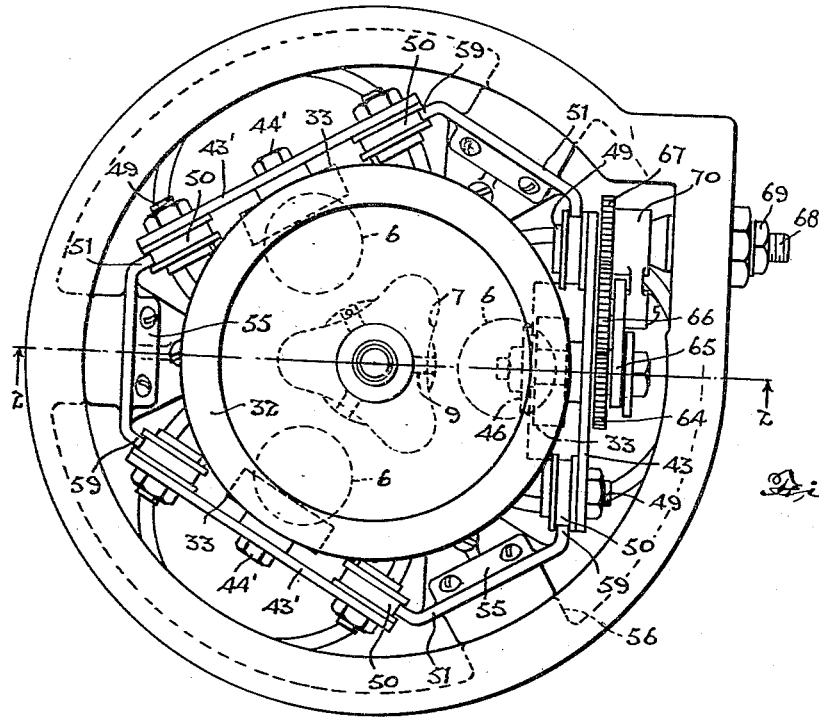
Figure 1 is a plan view of a meter with the cover removed.
Figure 3 is a transverse section through the meter taken on the line 3—3 of Figure 2.

The meter casing here shown is formed with a circular bottom plate 1 having a central orifice 2 in which the inflow pipe 3 is secured. Mounted on the plate 1 is a cylindrical body 4 which is provided with an inwardly extending flange 5 near the bottom thereof. This flange is provided with a plurality of circular holes 6, preferably three in number, which are arranged equidistant from the centre of the casing and are equally spaced apart and form the fluid inlets to the measuring cylinders.

A substantially triangular hole 7 is formed centrally of the flange 5 with the sides adjacent to the holes 6 and within this triangular hole is mounted a bushing 8 which has three spider arms 9 extending radially therefrom to rest in notches in the curved side walls of the triangular hole 7.

A face plate 10 having orifices corresponding with the holes 6 and 7 is secured to the underside of the flange 5 by bolts 11 which also support a gear ring 12 spaced from the face plate by the spacing sleeve 13 surrounding the bolts. The gear ring 12 is formed with a central orifice having gear teeth 14 in the form of an internal gear.

A valve 15 of ⟨◯⟩ shaped outline with conventional contours is arranged between the face plate 10 and the gear ring 12 and said valve is provided with a central boss 16 on its underside upon which is mounted a gear ring 17, the external teeth of which mesh with the teeth 14 of the internal gear ring 12. The valve is supported in its operating position with its upper edge surface in sealing contact with the underside of the face plate 10 by a spring disc 18 of spider formation mounted within the circular bottom plate 1 of the meter.

The central portion of the top side of the valve 15 is of hollow cupped formation and the recess 19 extends toward both ends of the valve between two solid circular spaced-apart areas 20—21. These areas are joined at the outer ends by the arc-shaped walls 22 and at the sides by the arc-shaped walls 23. The circular areas 20—21 are substantially the same diameter as are the holes 6 in the flange 5 and the face plate 10, and the spacing between the areas 20 and 21 is such that when the area 20 is covering one of the holes 6, as illustrated in Figure 4, the area 21 adjacent thereto will be between two of the holes 6.

It will be seen also on reference to Figure 4 that the third hole 6 covered by the valve will be open to the cupped recess 19 in the valve. When the valve and ports are in the relative position shown in Figure 4, liquid flowing upwardly through the inflow pipe 3 will pass through the spider portion of the spring disc 18 through the central opening of the gear ring 12 and up through the hole 6 not covered by the valve and fluid that may be held above the valve is retained from escaping through another hole 6 by the blank area 20 of the valve, while fluid retained above the other of the holes 6 may flow down into the cupped valve. The purpose of this arrangement will appear later in the following description.

Within the cupped portion of the valve is a centrally arranged boss 24 which is engaged by the crank pin 25 of a crank 26 mounted on a spindle 27, the lower end of which is journalled in the bushing 8 supported centrally in the triangular hole 7 in the bottom flange of the meter casing. The upper end of the spindle 27 is supported by a ball bearing 28 mounted in the cover 29 which closes the top of the body 4 of the meter. The upper end of the spindle extends through a suitable spring-held fluid-tight packing 30 and is connected to any suitable form of registering or indicating mechanism.

Secured upon the spindle 27 adjacent to its upper end is an oblique circular cam 31, the rim 32 of which has a steep pitch and is engaged by ball-bearing-supported rollers 33 mounted on pistons 34 which operate in cylinders 35 which are rigidly sscured to the inner face of the flange 5 of the meter body, one over each of the holes 6 through which the fluid enters to act as the motive power to propel the pistons which in turn rotate the spindle 27 through engagement with the cam 31.

The cylinders 35 are preferably formed of pressed or drawn steel cups having flanged or beaded outer edges and these cylinders are secured in position by means of suitable screws inserted through the disc 36 placed inside each cylinder and clamping the cylinder ends tightly against the flange 5.

The pistons 34 are preferably formed of a plate 37 formed with an upwardly flanged edge 38 and a circular plate 39 clamping therebetween a downwardly flanged washer or flexible disc 40, the flange of which engages the inner wall of the cylinder in sealing contact.

A dished plate 41 of circular form is secured to the plates 37, 39 and 40 by means of bolts or screws 42 and holds a tubular ring 42' which is preferably of resilient material but may be in the form of a spring ring and exerts an outward pressure against the flange of the flexible disc 40 to hold it in sealing contact with the inner perimeter of the cylinder.

A U-shaped bracket 43 is rigidly secured to the top plate 37 of the piston by screws or rivets or by being welded thereto. One leg of this bracket has mounted therein a horizontal bolt 44 which extends through an opening 45 in the adjacent leg of the bracket and is supported by a branch arm 46.

Figure 2:
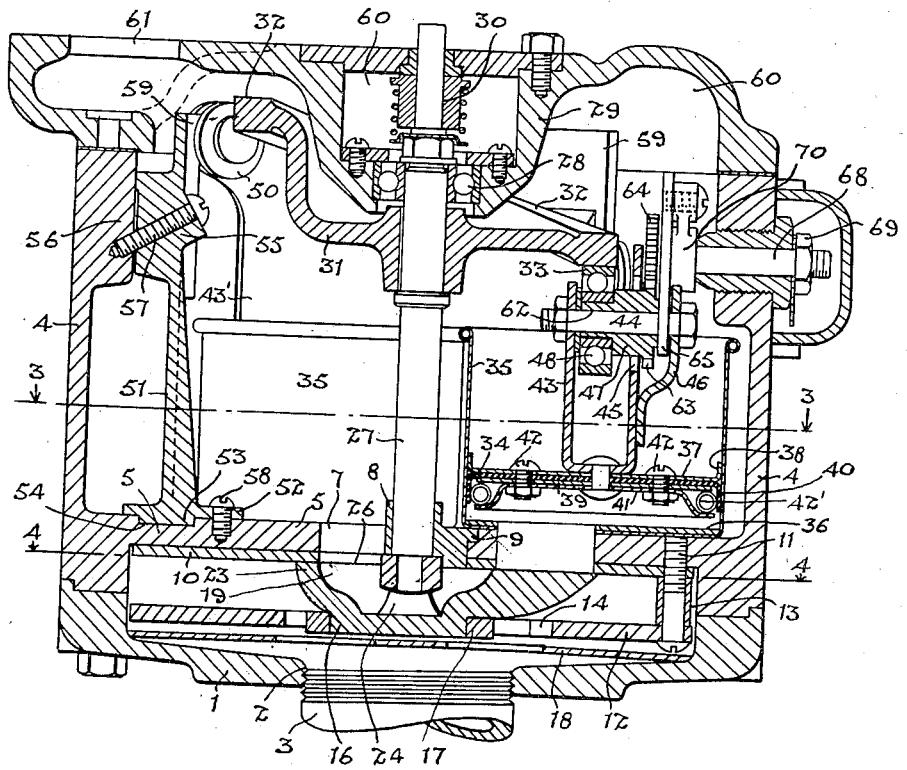
Figure 2 is a longitudinal elevation and section through the meter taken on the line 2—2 of Figure 1 when the valve is positioned as shown in Figure 15.
Figure 5:
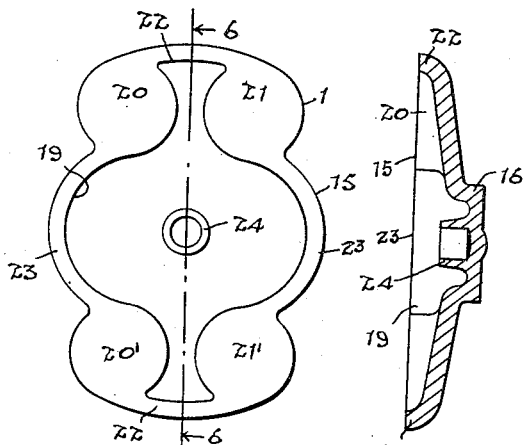
Figure 5 is a topside plan view of the valve for controlling the flow of fluid to the measuring cylinder.
Figure 6:
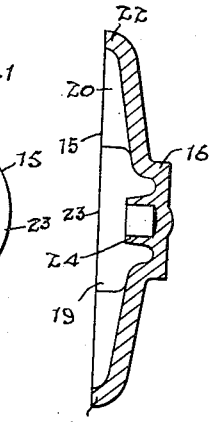
Figure 6 is a longitudinal sectional view through the line 6—6 of Figure 5.

A hub 47 has mounted thereon roller bearings 48 supporting the roller 33 for engaging the cam 31. The upper end of the U-bracket 43 is extended laterally as illustrated in Figures 2 and 8 and secured in each of these lateral extensions are studs 49 carrying the peripherally grooved rollers 50. It will be noted that two of the brackets 43' are not provided with the branch arms 46 but short bolts 44' rigidly secured in these brackets support hubs and roller-bearing-mounted rollers 33. The brackets 43' are also extended laterally similar to the bracket 43 and carry grooved rollers 50 mounted on the studs 49.

Figure 7:
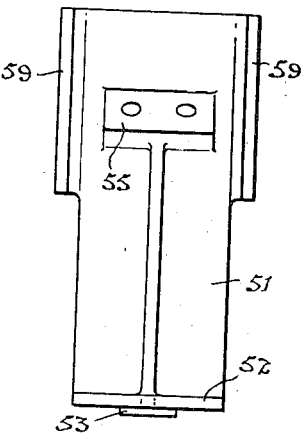
Figure 7 is an elevational detail of one of the piston guide members.
Figure 11:
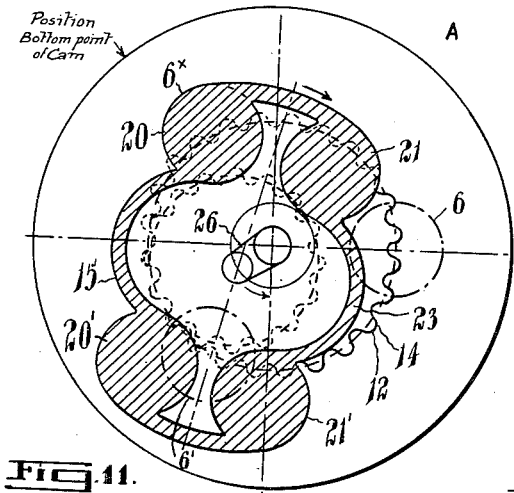
Figure 11 is a diagrammatic plan section, reduced, through the rotatable valve with the valve shown in the position shown in Figure 4 and illustrating the position of the crank for operating the valve.
Figure 12:
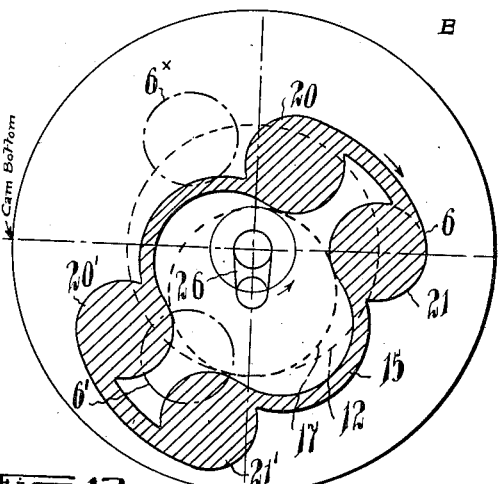
Figure 12 is a diagrammatic section similar to Figure 11 with the valve advanced to close the inlet port shown open in Figure 11 and the closed port, Fig. 11, shown open.
Figure 13:
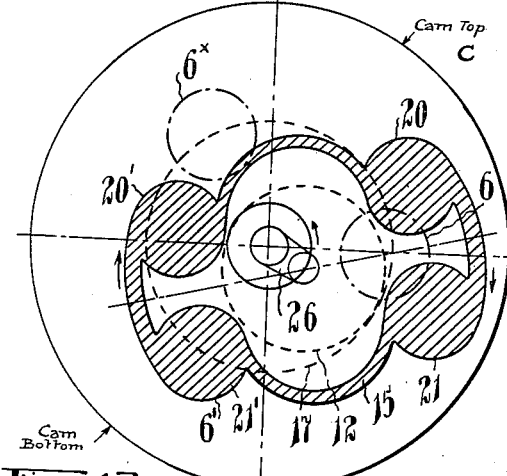
Figure 13 is a view similar to Figures 11 and 12 showing the valve advanced a further step showing the port, which is closed in Figure 12, open to discharge.
Figure 14:
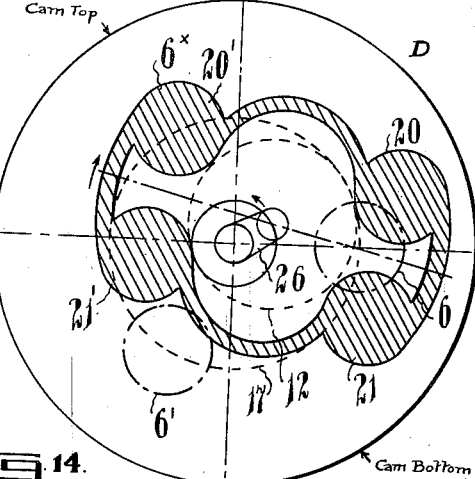
Figure 14 is a view similar to Figure 13 showing a further movement of the crank and the valve following the position shown in Figure 13.
Figure 15:
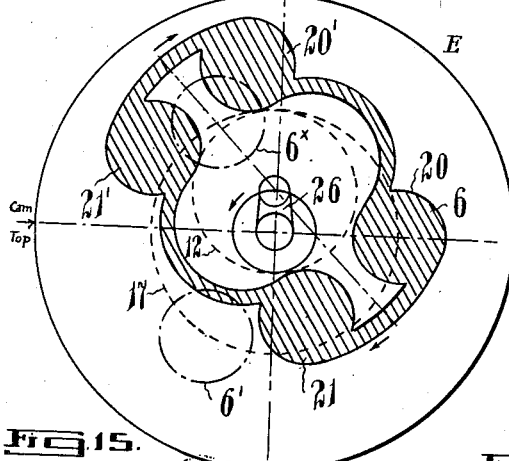
Figure 15 is a view similar to Figure 14 showing a still further advance of the crank and valve and their associated parts.
Figure 16:
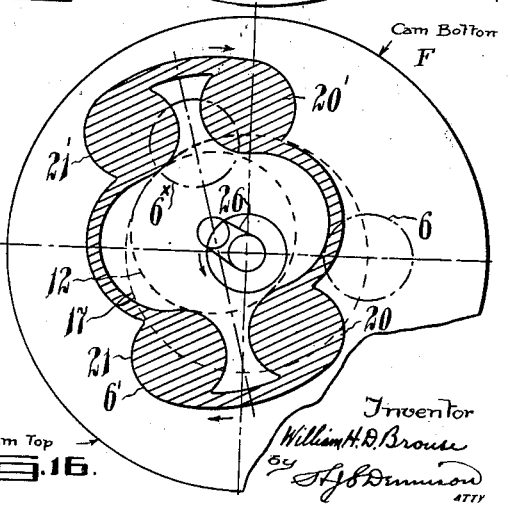
Figure 16 is a view similar to Figure 15 showing the crank and valve advanced a further and last step in the cycle of operation.

Vertical guide brackets 51, as illustrated in elevation in Figure 7 and in vertical section in Figure 2, are provided with base flanges 52 which rest upon the top of the flange 5 of the body 4 and are set in position on the flange with a small circular hub 53 which extends into a recess 54 formed in the top surface of the flange 5. Each of the brackets 51 is formed with an outwardly projecting lug 55 which fits snugly against an inwardly projecting lug 56 provided on the inner wall of the cylindrical body 4. A screw 57 extends through the upper lug 55 into the lug 56 and a screw 58 extends through the base flange 52 into the body flange 5.

The top end of each of the brackets 51 is formed with laterally turned portions 59 disposed in obtuse angular relation to the bracket and these lateral flanges 59 form vertical guides which extend into the peripheral grooves of the rollers 50 carried by the pistons.

It will be noted that each of the pistons is provided with an upwardly extending bracket provided at the upper end with a pair of grooved rollers 50 and these rollers engage the vertical guiding flanges 59 arranged between the brackets of adjacent pistons. The pistons are thus guided by roller-bearing-supported rollers in their vertical movement in operating against the undersurface of the cam 31.

The cover 29 closing the cylindrical body 4 is provided with a domed cavity 60 extending around the central portion supporting the bearing for the spindle 27 and an outlet passage 61 leads through the top thereof to conduct the fluid from the meter.

It is desirable that means be provided for adjusting at least one of the measuring pistons and the means herein shown consists in forming the hub 47 on the bracket 43 with an eccentric portion 62 upon which the ball bearing 48 is mounted. The hub is rotatably mounted on the bolt 44 and has formed on its outer end a spur gear 63 which is in mesh with an idler pinion 64 mounted on a triangular-shaped plate 65 rotatably mounted on the bolt 44.

A second idler pinion 66 is rotatably mounted on a stud carried by the plate 65 and meshes with the idler 64, and the idler 66 meshes with a spur gear 67 fixedly mounted on the end of a spindle 68 which extends through the wall of the casing or body 4 and is secured from rotation by means of a lock nut 69.

A link 70 is pivotally mounted on the spindle 68 and is pivotally connected to the plate 65 by the stud carrying the idler pinion 66.

It will be noted on reference to Figures 9 and 10 that when the piston carrying the bracket 43 moves vertically from the position shown in Figure 9 to the position shown in Figure 10 the triangular plate 65 will be swung on its pivot on the bracket, it being held in a flexible floating position by the pivotal link 70 which rotates on the spindle 68. The plate carries with it the spur gear 63 mounted on the end of the eccentric hub and also the idlers 64 and 66 and, as these gears are in mesh and the idler 66 is in mesh with the stationary gear 67, the idlers will be rotated on their axes and they will rotate the eccentric hub through the gear 63.

It will be readily understood that each reciprocating action of the piston will be of the same length irrespective of this geared connection and of the eccentric mounting of the cam-engaging roller but if the fixed gear mounted on the spindle 68 is rotated the movement imparted to the gear 67 will be imparted through the idlers and the gear 63 to the eccentric and the position of the eccentric bearing of the roller will thus be altered and the length of travel of the piston will be changed in accordance with the relative position of the eccentric carrying the cam-engaging roller. As a consequence the travel of the piston may be adjusted to be increased or decreased within certain limits with a very fine adjustment.

Other means for adjusting the length of throw of the measuring piston may be adopted and it is to be understood that no claim is made in this patent application for the structure of the adjusting mechanism herein described, per se, as such is being claimed separately in a co-pending patent application.

In the operation of the meter herein shown and described the fluid to be measured flows into the meter through the inflow pipe 3 and the fluid, entering the chamber in which the valve is located through the opening in the gear ring 12, presses the valve into snug fluid-tight engagement with the face plate 10.

In the position of the parts as shown in Figures 2 and 4 the hole or port 6 leading into one of the cylinders is open to the space outside the cupped valve and the fluid flows in and forces the piston upwardly. The roller 33 carried by this piston pushes upwardly against the oblique rim of the cam 31 and causes the cam to rotate in an anti-clockwise direction. The rotation of the cam rotates the spindle 27, to which it is secured, and it in turn rotates the crank 26 secured to the lower end thereof.

The crank pin 25, being journalled in the boss 24 in the valve, swings the valve with an orbital movement in a circle around the centre of the internal gear ring 12 and the gear pinion mounted on the valve, meshing with the toothed inner edge of the gear ring, causes the valve to rotate in a clockwise direction on the axis of the crank pin.

When the valve is in the position illustrated in Figure 4 the hole or port 6 on the transverse axis of the meter is open to the inflowing fluid and fluid entering through the inlet pipe will flow upwardly through the central opening of the gear ring and the port 6 into the cylinder as described.

It will be noted that the circular area 20 of the valve is shown as closing the port $6^x$ next-adjacent to the port 6 in an anti-clockwise direction and it will also be noted that the remaining port 6' from the third cylinder is shown open to the central cavity in the top side of the valve which is sealed against the fluid flowing into the meter from the pipe 3.

The movement imparted to the cam, its spindle and the crank connected to the valve by the upward movement of the piston, causes the valve to rotate in a clockwise direction to bring the area 21 thereof over the port 6 which has been described as being open, and simultaneously the area 20 of the valve moves to uncover the next-adjacent port $6^x$, allowing fluid to flow into the next cylinder and cutting off the flow of fluid to the first one. The remaining cylinder port 6' is open to discharge through the central cavity of the valve while the port 6 is open to inlet and remains open until port 6 is closed and permits the discharge of fluid from its communicating cylinder through the opening 7 into the central cavity of the meter casing. The continued swinging of the valve then opens the first-mentioned cylinder port 6 to discharge into the valve cavity, and simultaneously, the port to the third cylinder 6' becomes closed, then the closing the area 21' of the opposite end of the valve progressively closes the port 6' to discharge and opens it to permit the inflow of fluid to the third cylinder while the area 20' is moving to a position to close the port $6^x$.

This cycle of operation continues progressively opening and closing the cylinders to the inflow and progressively opening and closing them to discharge through the cavity in the valve. The cavity in the valve remains constantly open to the substantially triangular opening 7 in the face plate 10 and its supporting flange, and the fluid discharged from each cylinder flows through the valve and into the body of the meter casing and discharges through the outlet 61.

The peculiar movement of the valve with its combined orbital and rotary motion causes a surface contact which will avoid the grooving or cutting of the metal surfaces and the continued combined movement produces a lapping effect which effectively polishes the surfaces.

The construction of the meter as herein described is extremely simple. There are no intricate or delicate parts to be adjusted or to wear or become distorted and the whole mechanism is simple and inexpensive to manufacture and will remain in accurate service indefinitely.

It will of course be understood that any suitable form of indicating or recording mechanism for showing the quantity of fluid flowing through the measuring cylinders may be attached to the end of the spindle 27 which extends beyond the cover of the casing.

What I claim as my invention is:

1. In a fluid meter, the combination with a casing and a multiplicity of measuring cylinders arranged therein each having a port opening from a common fluid inlet chamber, a spindle for operating an indicating mechanism, pistons operable in said cylinders and means operated by said pistons and connected with said spindle for translating their reciprocating movement to operate said spindle, of a valve operatively connected with said spindle to move in an orbit, and means for rotating said valve on its axis during its orbital movement to successively open and close the cylinder ports to the inflow and discharge of fluid.

2. A fluid meter as claimed in claim 1 in which the valve rotating means comprises a toothed gear concentric with the axis of rotation of the valve, and a fixed toothed gear eccentric to the axis of rotation of the valve arranged to engage the gear on said valve in its orbital movement to cause said valve to rotate on its axis to open the cylinder ports in succession to the inflow of fluid and to successively direct the discharge of fluid from the measuring cylinders.

3. A fluid meter as claimed in claim 1 in which the valve is formed with a longitudinally extending recess on one side thereof to form a discharge channel from said cylinder ports, said valve having port-closing areas at each end, the means for rotating the valve comprising an external toothed gear arranged centrally thereof, and an internal toothed gear ring meshing with the external gear of said valve during its orbital movement and rotating said valve on its axis to successively open the cylinder ports to the inlet of fluid and to the discharge of fluid through the valve progressively in rotation.

4. In a fluid meter, a casing having a transverse flange dividing the interior, said flange having a central opening and a plurality of ports therethrough spaced equidistant from the centre, a cupped valve engaging said ported flange and constantly covering the central opening and adapted to intermittently open said ports first to permit the flow of fluid therethrough around said valve then through said valve to the central opening, a plurality of cylinders arranged equidistant and one open to each of said ports, pistons operating in said cylinders, means operatively connected with said pistons to impart an orbital movement to said valve, and means for rotating said valve on its axis during its orbital movement.

5. In a fluid meter, a casing having a transverse dividing wall to form an inlet chamber and a discharge chamber, a plurality of cylinders mounted on the discharge side of said dividing wall, ports opening through said dividing wall to said cylinders and to the discharge chamber, a valve engaging the inlet side of said wall and having a cupped recess therein in constant communication with the port leading to the discharge chamber, said valve being of elongated form and having areas at the ends adapted to periodically register with and close the ports leading to said cylinders, pistons in said cylinders operated by the flow of fluid thereinto, a spindle rotated by the operation of said pistons, means connected with said spindle and operatively engaging said pistons to rotate said spindle, a crank secured to said spindle and operatively connected to operate said valve with an orbital movement, and means for causing said valve to rotate on its axis coincident with its orbital movement to progressively open the cylinder ports to the inlet chamber and then to the discharge chamber through the valve recess.

6. In a fluid meter, a casing having a dividing wall arranged transversely, said wall having an opening centrally therethrough and port openings spaced from the centre, cylinders secured to said dividing wall and each open to one of said ports, pistons operating in said cylinders, a spindle axially journalled in said casing, a cam on said spindle operatively engaged by said pistons, a crank secured to said spindle, an elongated valve rotatably mounted on said crank and engaging said dividing wall to effect the opening and closing of the ports to said cylinders, a gear mounted on said valve, and a gear ring meshing with said valve gear and rotating same on its pivot while said valve is moved orbitally by said crank.

7. In a fluid meter, a casing having a transverse partition intermediate of its length provided with a central opening and ports equidistantly arranged, cylinders formed of drawn cup-shape rigidly secured to said partition and each having an opening in the bottom communicating with one of said ports, a bearing mounted centrally of the central opening in said transverse partition, a bearing in the end of said casing, a spindle journalled in said bearings, an oblique cam on said spindle, pistons in said cylinders, brackets secured to said pistons, rollers mounted in said brackets engaging said cam to rotate said spindle, means for guiding said piston brackets, a crank on said spindle, a valve of elongated form rotatably mounted on said crank and having areas at the ends adapted to co-operate with said cylinder ports, and means for rotating said valve on said crank during the orbital movement of the valve.

8. A fluid meter comprising a cylindrical casing, a bottom plate closing said casing having an inflow orifice, a cover closing the top of said casing having an outflow orifice, a flange extending inwardly adjacent the bottom end of said casing having a central opening and ports spaced therearound, a spindle mounted axially of said casing, a crank on the lower end of said spindle, an elongated cupped valve rotatably mounted on said crank and having its cupped face turned upwardly and communicating constantly with the central opening of said flange and the space within the casing above the flange, said valve having areas at the ends adapted to close the ports in said flange, spring means for holding said valve against the underside of said ported flange, a gear ring spaced from said flange and having a centrally toothed orifice, a gear pinion on said valve meshing with and rotating in said gear ring, cylinders secured to said ported flange, pistons operating in said cylinders, and means operated by said pistons for rotating said spindle.

9. A fluid meter as claimed in claim 1 having means for regulating the stroke of one of said pistons.

10. A fluid meter as claimed in claim 1 having means mounted on the casing and extending therethrough and connected with one of the pistons and adapted upon manipulation from outside the casing to regulate the stroke of the piston to which it is attached.

WILLIAM H. D. BROUSE.